US009760286B2

(12) United States Patent
Abhijeet et al.

(10) Patent No.: US 9,760,286 B2
(45) Date of Patent: Sep. 12, 2017

(54) ADAPTIVE DISPERSED STORAGE NETWORK (DSN) AND SYSTEM

(71) Applicant: International Business Machines Corporation, Armonk, NY (US)

(72) Inventors: Kumar Abhijeet, Chicago, IL (US); Greg R. Dhuse, Chicago, IL (US); S. Christopher Gladwin, Chicago, IL (US); Gary W. Grube, Barrington Hills, IL (US); Timothy W. Markison, Mesa, AZ (US); Jason K. Resch, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/451,906

(22) Filed: Mar. 7, 2017

(65) Prior Publication Data

US 2017/0177230 A1 Jun. 22, 2017

Related U.S. Application Data

(63) Continuation of application No. 15/250,013, filed on Aug. 29, 2016, which is a continuation-in-part of (Continued)

(51) Int. Cl.
*G06F 15/16* (2006.01)
*G06F 3/06* (2006.01)
(Continued)

(52) U.S. Cl.
CPC ............ *G06F 3/0604* (2013.01); *G06F 3/067* (2013.01); *G06F 3/0619* (2013.01);
(Continued)

(58) Field of Classification Search
CPC ............................ H04L 63/0428; H04L 69/04
(Continued)

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Chung; An Automatic Data Segmentation Method for 3D Measured Data Points; National Taiwan University; pp. 1-8; 1998.

(Continued)

*Primary Examiner* — Arvin Eskandarnia
(74) *Attorney, Agent, or Firm* — Garlick & Markison; Timothy W. Markison; Shayne X. Short

(57) ABSTRACT

A computing device includes an interface configured to interface and communicate with a dispersed storage network (DSN), a memory that stores operational instructions, and a processing module operably coupled to the interface and to the memory such that the processing module, when operable within the computing device based on the operational instructions, is configured to perform various operations. When additional unique pillar combinations of at least read threshold number of encoded data slices (EDSs) supported by EDSs may be needed, the computing device dispersed error encodes each data segment in accordance to generate additional pluralities of EDSs and distributedly stores the additional pluralities of EDSs associated respectively with the data object across the plurality of SUs within the DSN to support the additional unique pillar combinations of the at least read threshold number of EDSs.

20 Claims, 8 Drawing Sheets

Related U.S. Application Data application No. 14/705,752, filed on May 6, 2015, which is a continuation of application No. 14/336,189, filed on Jul. 21, 2014, now Pat. No. 9,043,616, which is a continuation of application No. 12/885,124, filed on Sep. 17, 2010, now Pat. No. 8,819,452.

(60) Provisional application No. 61/264,534, filed on Nov. 25, 2009.

(51) Int. Cl.
| | |
|---|---|
| G06F 11/10 | (2006.01) |
| G06F 21/62 | (2013.01) |
| H04L 29/06 | (2006.01) |
| G06F 21/60 | (2013.01) |
| H03M 13/15 | (2006.01) |
| H03M 13/00 | (2006.01) |

(52) U.S. Cl.
CPC .......... *G06F 3/0644* (2013.01); *G06F 3/0659* (2013.01); *G06F 11/1092* (2013.01); *G06F 21/602* (2013.01); *G06F 21/6218* (2013.01); *H03M 13/1515* (2013.01); *H03M 13/616* (2013.01); *H04L 63/08* (2013.01); *H04L 63/101* (2013.01); *H04L 63/102* (2013.01)

(58) Field of Classification Search
USPC ........................................................ 713/193
See application file for complete search history.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,447,740 | B1 * | 5/2013 | Huang et al. ................. 707/692 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0086117 | A1 * | 5/2004 | Petersen et al. ................. 380/44 |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0157320 | A1 * | 7/2005 | Sako et al. ................... 358/1.12 |
| 2005/0182985 | A1 * | 8/2005 | Shipton et al. ............... 713/340 |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2008/0044011 | A1 * | 2/2008 | Yoshida et al. ................. 380/28 |
| 2009/0094251 | A1 | 4/2009 | Gladwin et al. |
| 2009/0094318 | A1 | 4/2009 | Gladwin et al. |
| 2009/0112949 | A1 * | 4/2009 | Ergan et al. ................... 707/205 |
| 2009/0132825 | A1 * | 5/2009 | Mohanty ....................... 713/176 |
| 2009/0249084 | A1 * | 10/2009 | Ogawa .......................... 713/193 |
| 2010/0023524 | A1 | 1/2010 | Gladwin et al. |
| 2011/0173460 | A1 * | 7/2011 | Ito et al. ....................... 713/193 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

(56) References Cited

OTHER PUBLICATIONS

Smith; Lightweight Directory Access Protocol (LDAP): Uniform Resource Locator; IETF Network Working Group; RFC 4516; Jun. 2006; pp. 1-15.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

\* cited by examiner

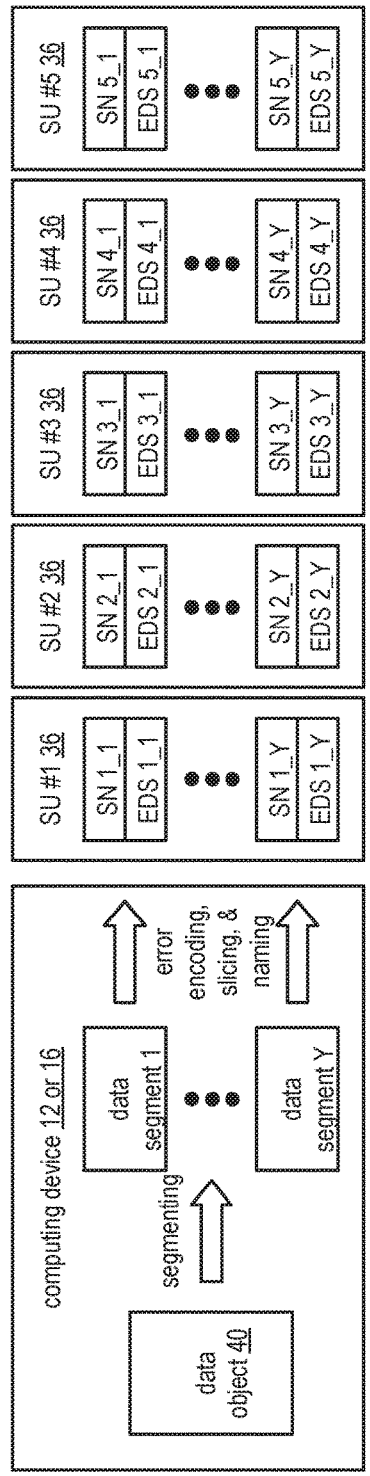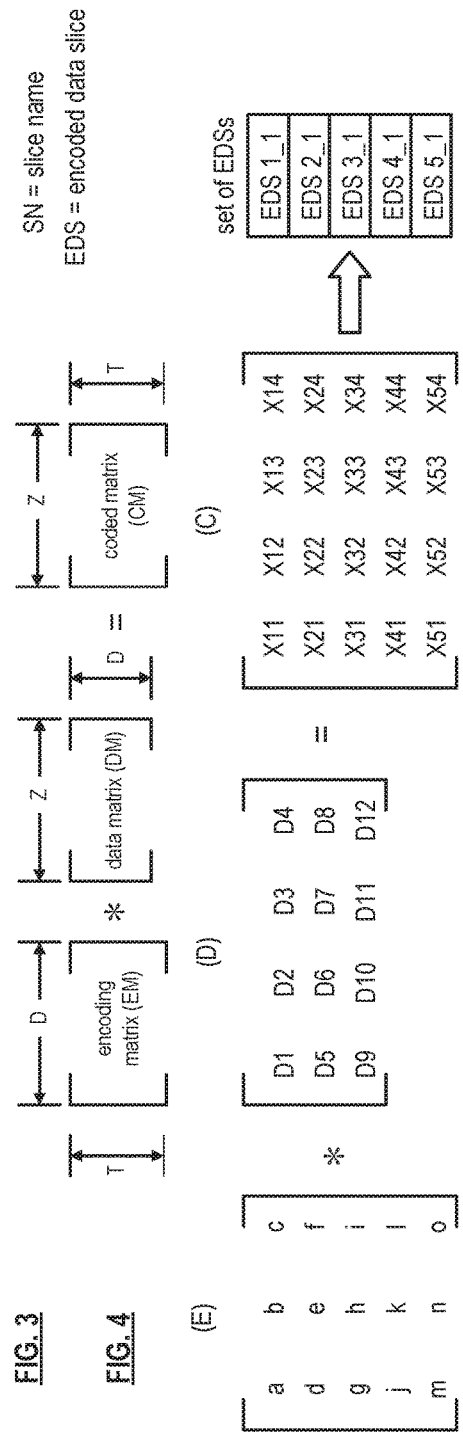

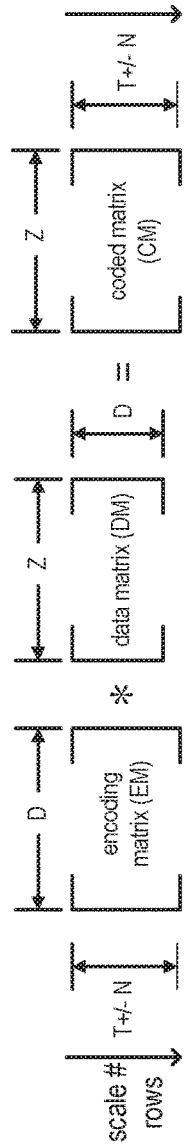
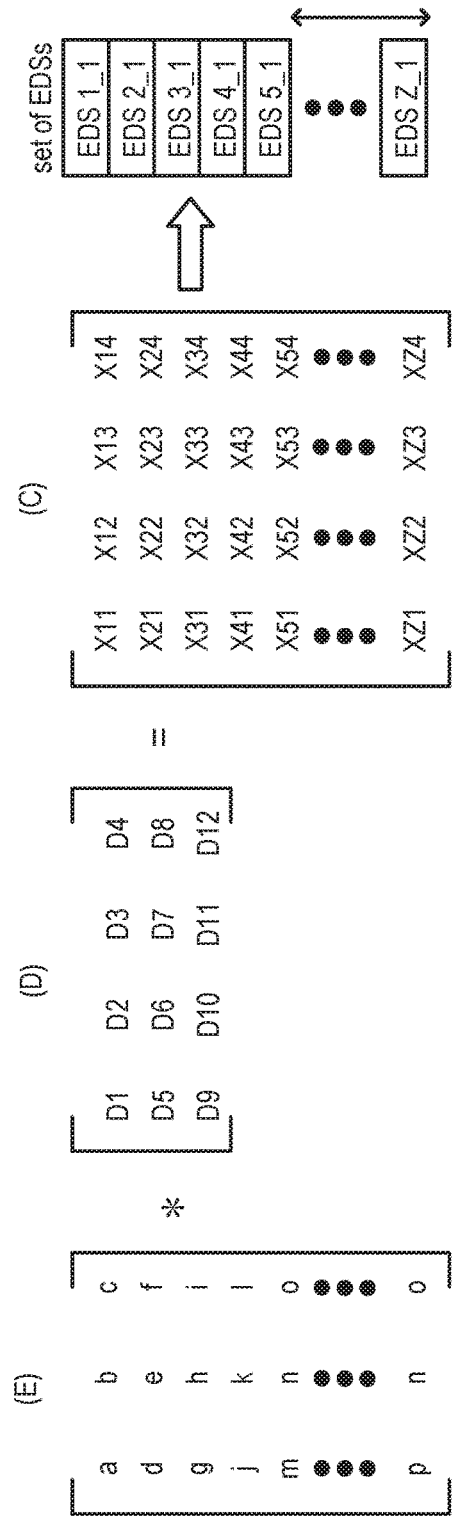
FIG. 11A 1101
FIG. 11B 1102

ADAPTIVE DISPERSED STORAGE NETWORK (DSN) AND SYSTEM

CROSS REFERENCE TO RELATED PATENTS

The present U.S. Utility patent application claims priority pursuant to 35 U.S.C. §120, as a continuation of U.S. Utility patent application Ser. No. 15/250,013, entitled "ADAPTIVE DISPERSED STORAGE NETWORK (DSN) AND SYSTEM," filed Aug. 29, 2016, which claims priority pursuant to 35 U.S.C. §120, as a continuation-in-part (CIP) of U.S. Utility patent application Ser. No. 14/705,752, entitled "EFFICIENT STORAGE OF ENCRYPTED DATA IN A DISPERSED STORAGE NETWORK," filed May 6, 2015, which claims priority pursuant to 35 U.S.C. §120, as a continuation of U.S. Utility patent application Ser. No. 14/336,189, entitled "EFFICIENT STORAGE OF ENCRYPTED DATA IN A DISPERSED STORAGE NETWORK," filed Jul. 21, 2014, now issued as U.S. Pat. No. 9,043,616 on May 26, 2015, which claims priority pursuant to 35 U.S.C. §120, as a continuation of U.S. Utility patent application Ser. No. 12/885,124, entitled "EFFICIENT STORAGE OF ENCRYPTED DATA IN A DISPERSED STORAGE NETWORK," filed Sep. 17, 2010, now issued as U.S. Pat. No. 8,819,452 on Aug. 26, 2014, which claims priority pursuant to 35 U.S.C. §119(e) to U.S. Provisional Application No. 61/264,534, entitled "DISTRIBUTED STORAGE DE-DUPLICATION," filed Nov. 25, 2009, all of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Within a memory storage system, as the number of users associated with such a memory storage system may increase, the memory storage system may be unable to service all of the associated requests made by the users. The prior art does not provide an adequate means by which a memory storage system can service changing number of users and variable numbers of requests for data made by the users.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 11A is a schematic block diagram of another example of an error encoding function in accordance with the present invention;

FIG. 11B is a schematic block diagram of another example of an error encoding function in accordance with the present invention.

DETAILED DESCRIPTION OF THE INVENTION

Figure 1:
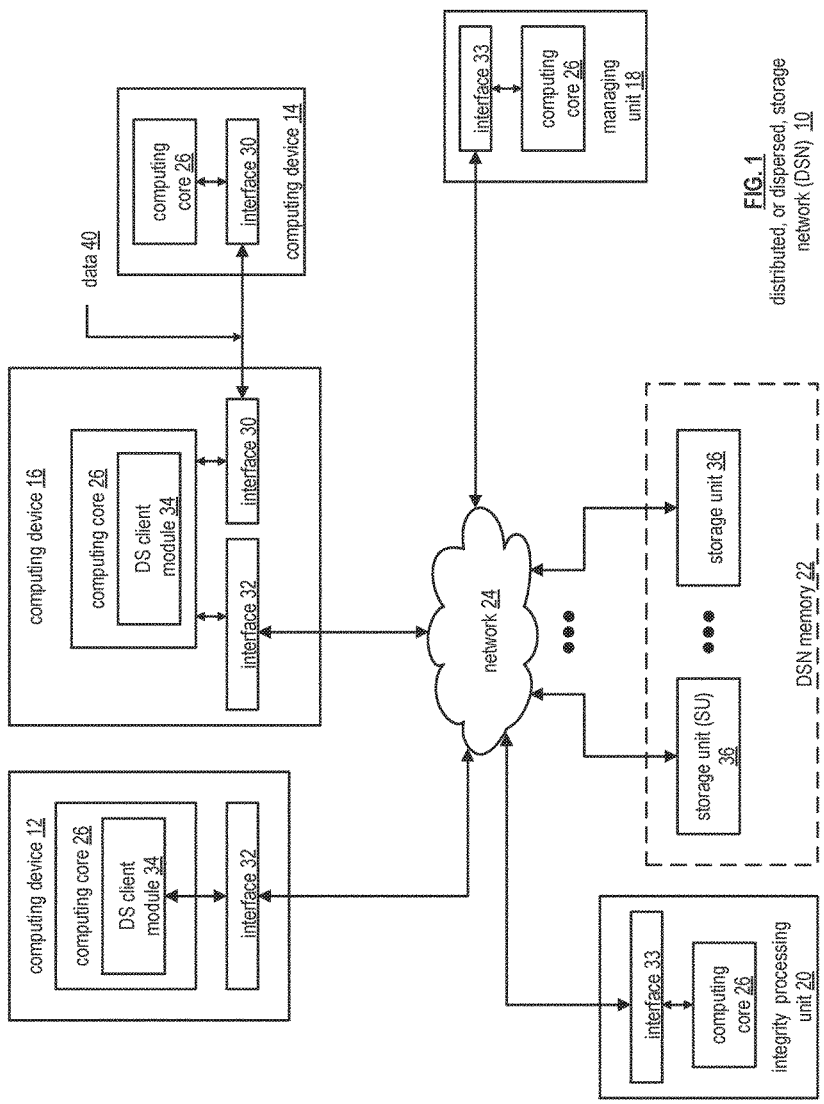
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
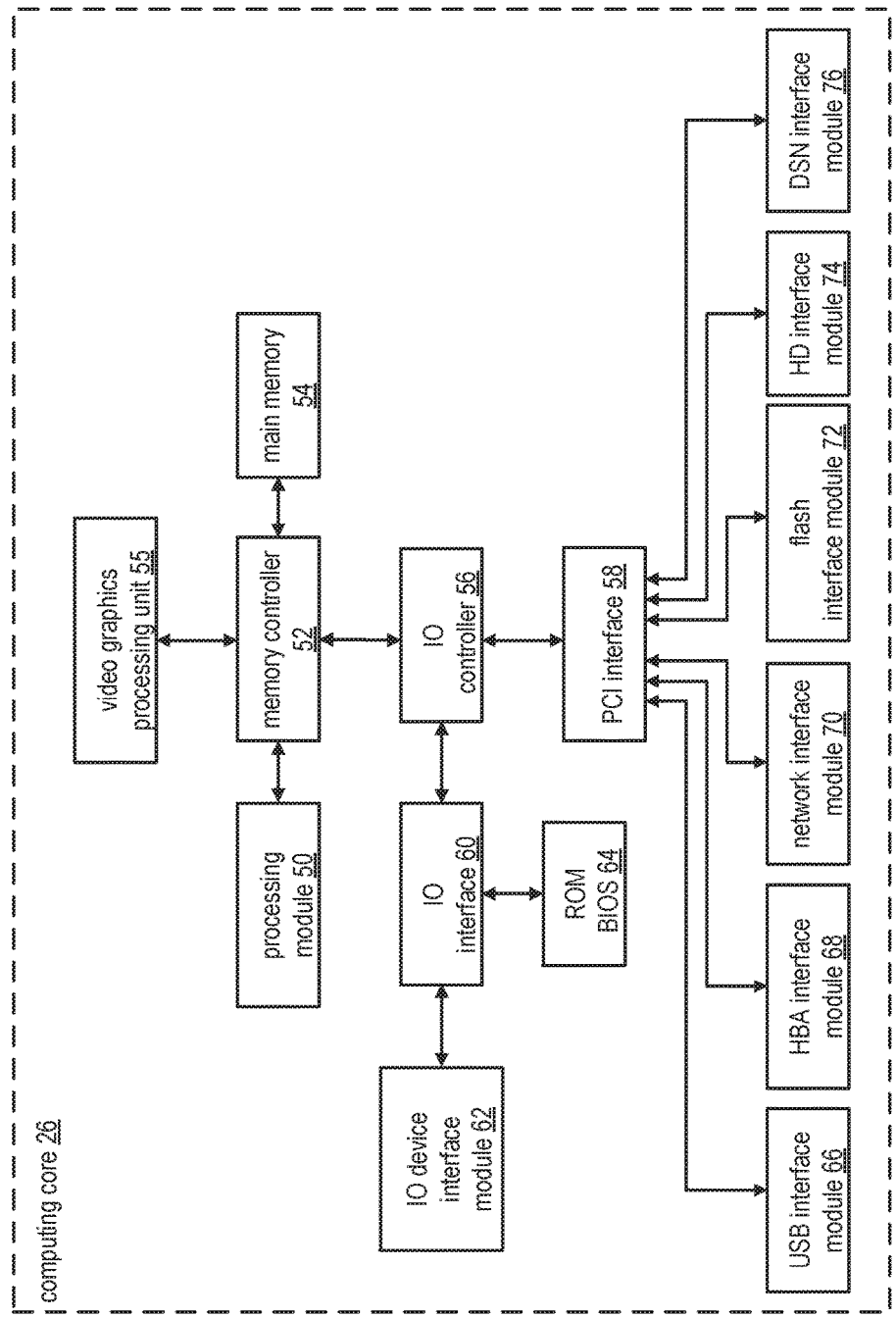
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an 10 interface module 60, at least one 10 device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
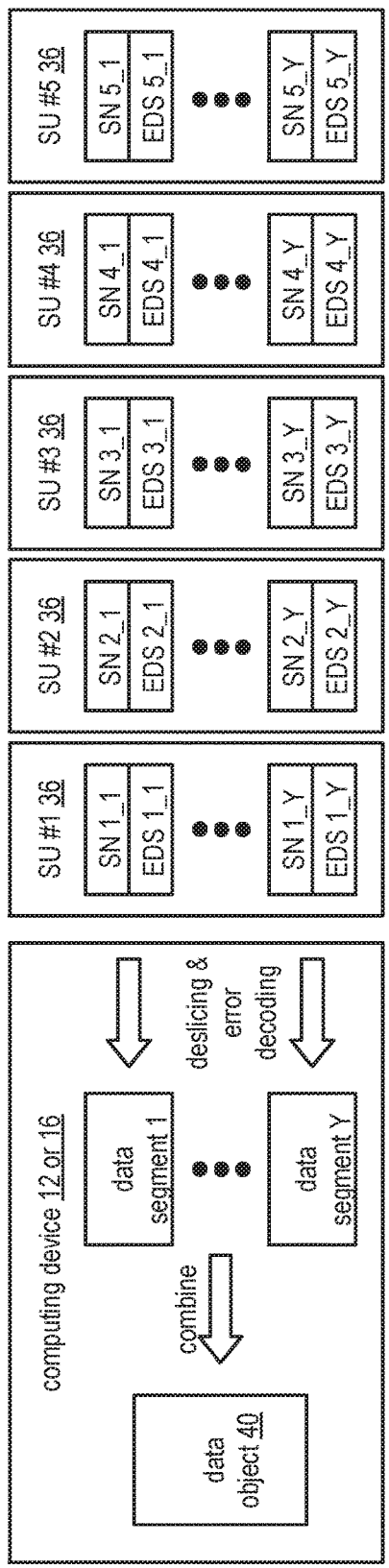
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
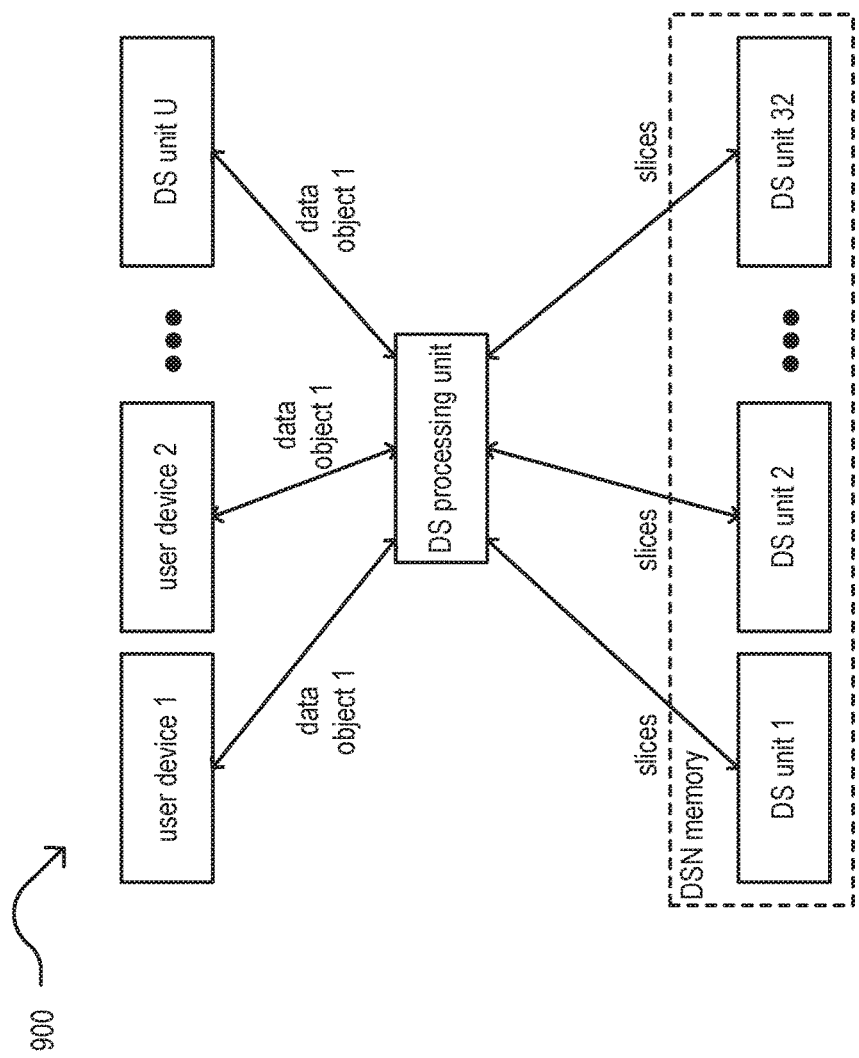
FIG. 9 is a schematic block diagram of an example of a computing system in accordance with the present invention.

FIG. 9 is a schematic block diagram of an example of a computing system in accordance with the present invention. This diagram shows an embodiment of a computing system where users send substantially identical data objects to the DS processing unit for backup storage in the DSN memory. The DS processing unit optimizes the efficiency of the storage of the data objects through data storage and data retrieval methods discussed below.

In an embodiment, the system includes a plurality of user devices 1-U, the DS processing unit, and the DSN memory. The DSN memory includes DS units 1-32. The user device may include DS processing. In an embodiment, the user device may store/retrieve data objects to/from the DSN memory via the DS processing unit. In another embodiment, the user device may store/retrieve data objects directly to/from the DSN memory.

In an embodiment, the user device may send a command (e.g., store), a data object (e.g., simple object file, block file), and supplemental information (e.g., data object name, user ID, data type, data size, etc.) to the DS processing unit to distributedly store the data object in the DSN memory. For example, the user device may determine to backup a data object in the DSN memory, send the data object with a store command to the DS processing unit, and subsequently retrieve the data object via the DS processing 30 unit and/or directly from the DSN memory when the user device determines to retrieve a backup data object.

In another embodiment, the user device may send a command (e.g., store), a data object (e.g., simple object file, block file), and supplemental information (e.g., data object name, user ID, data type, data size, etc.) to the DS processing unit to distributedly store the data object in the DSN memory. For example, the user device may determine to backup up a data object in the DSN memory and send the data object with a store command to the DS processing unit. The DS processing unit may create compressed encrypted data segments and/or compressed encrypted EC data slices of the data object for storage in the DSN memory such that the DSN memory utilization is optimized based on a factor. Note that the factor may include the creation, reuse, and utilization of one or more encryption keys used to encrypt the data segments and/or slices. The user device subsequently retrieves the slices via the DS processing unit and/or directly from the DSN memory when the user device determines to retrieve a backup data object. The DS processing of the user device and/or of the DS processing unit may utilize the one or more encryption keys to convert the retrieved slices into the data object.

In another embodiment, the user device may send a command (e.g., store), a hash of the data object, and supplementary information (e.g., data object name, user ID, data type, data size, etc.) to the DS processing unit when the user device determines to backup the data object in the DSN memory. The DS processing determines if the data object is already stored in memory based on one or more of, but not limited to comparing the hash of the data object to a list of hash values corresponding to previously stored data objects and/or by a direct comparison of the data object to previously stored data objects. For example, the user device may determine to backup up a data object in the DSN memory, determine the hash of the data object, and send the hash of the data object with a store command to the DS processing unit. The DS processing unit requests that the user device send the data object to the DS processing unit so that the DS processing unit can distributedly stores the data object in the DSN memory when the DS processing unit determines that the data object is not already stored in the DSN memory based on comparing the hash of the data object to stored hash values. The user device subsequently retrieves the data object via the DS processing unit and/or directly from the DSN memory when the user device determines to retrieve a backup data object.

Note that the data object may be subject to copyright protection law where a backup copy is allowed. The DS processing unit may assign a unique one or more sets of pillar combinations to each user device that has stored the same data object for subsequent use to retrieve the data object. For example, a 32/24 system has a pillar width n=32 and a read threshold of 24 pillars. There are over 10 million ways to choose 24 read pillars from the 32 pillars. In one instance, 10 million user devices may store the same data object 1 yet subsequently retrieve the data object 1 utilizing their own unique read pillar combination. In another instance of the 32/24 system, over 200 thousand unique combinations of 27 read pillars (e.g., with a read threshold of 24) may be utilized to improve the read reliability of the system. Over 200 thousand user devices may 5 receive one unique read pillar combination or 20 thousand user devices may receive ten unique read pillar combinations etc.

The user device and/or DS processing unit retrieves the EC data slices from the DS unit pillars of at least one unique read pillar combination that was previously assigned to the user device. The user device and/or DS processing unit may retrieve the EC data slices from the DS unit pillars utilizing a second one the unique read pillar combinations (e.g., when more than one read pillar combination is assigned) when the first one of the unique read pillar combinations does not result in a successful data segment recreation (e.g., a read threshold number of pillars were not available in the first attempt). Such methods to create and utilize the unique read pillar combinations is discussed in greater detail herein.

Figure 10:
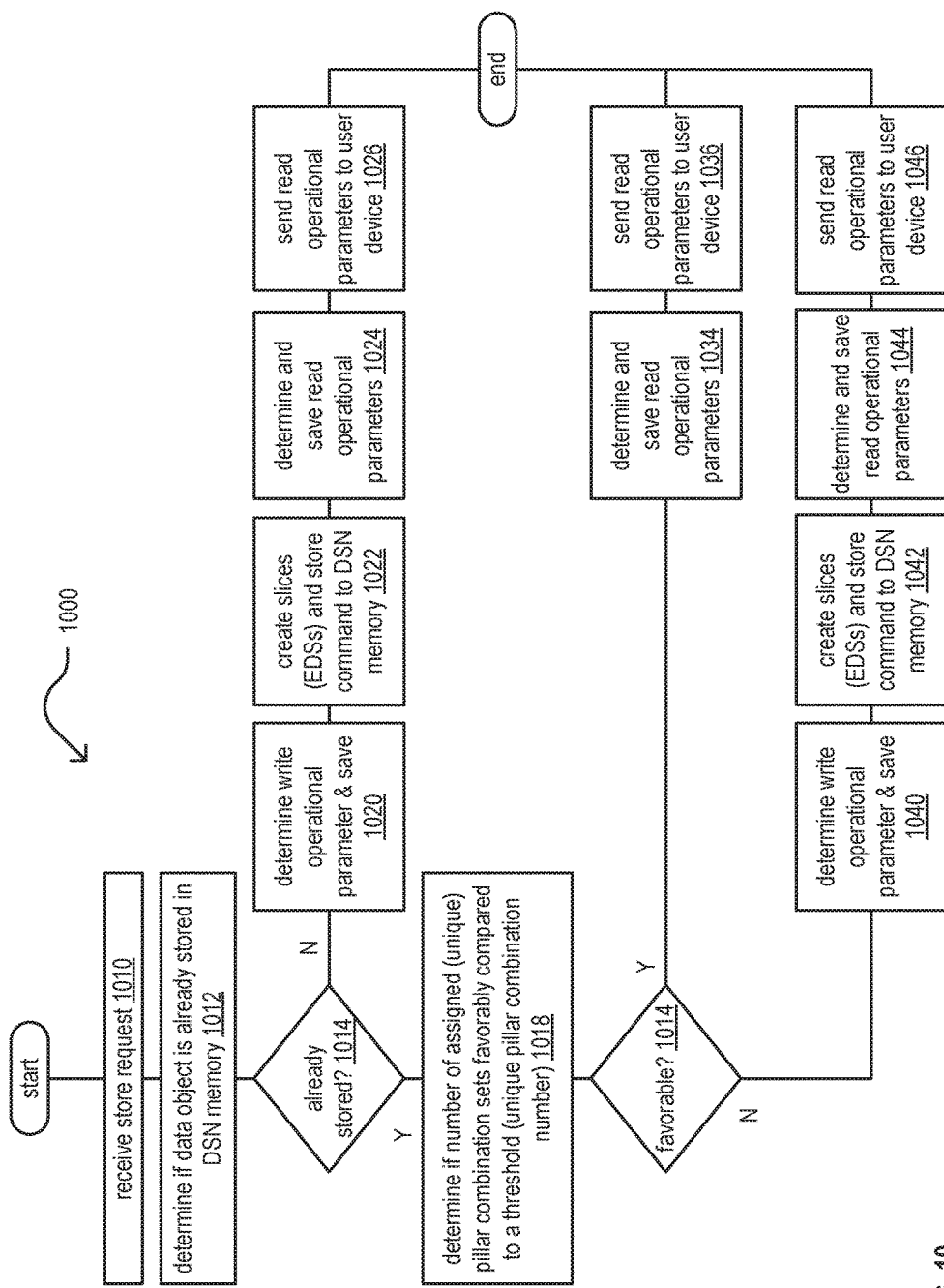
FIG. 10 is a diagram illustrating an embodiment of a method for execution by one or more or more computing devices in accordance with the present invention.

FIG. 10 is a diagram illustrating an embodiment of a method 1000 for execution by one or more computing devices in accordance with the present invention. This diagram shows a flowchart illustrating the storing of a data object by a DS processing where the DS processing optimizes DSN memory utilization by storing slices of a data object when the data object is not already stored in the DSN memory.

The method 1000 begins with the step 1010 of the DS processing of the user device, the DS processing unit, the storage integrity processing unit, and/or the DS managing unit receiving a store request message (e.g., from a user device). The store request message may include one or more of, but not limited to a store request command, a user ID, a data object name, a data object, a hash of the data object, a data size, a data type, a priority indicator, a security indicator, and/or a performance indicator.

In an embodiment, the DS processing determines in step 1012 if the data object is substantially already stored in the DSN memory. The determination may be based on one or more of, but not limited to comparing the data object with stored data objects, comparing the data object name with data object names of stored data objects, comparing the hash of the data object with hashes of stored data objects, the user ID, the data object name, the data size, the data type, the priority indicator, the security indicator, and/or the performance indicator. For example, the DS processing determines that the data object is substantially already stored in the DSN memory when the hash of the data object is the same as a hash of a previously stored data object. Note that the hash of the data object may be received from the requester or calculated by the DS processing when the DS processing receives the data object. In another example, the DS processing determines that the data object is not substantially already stored in the DSN memory when the security indicator of the data object is above a threshold. The DS processing may always store a copy when the security indicator is above the threshold.

The method 1000 branches to the step 1018 where the DS processing determines if the number of assigned pillar combinations for the present storage set compares favorably to a threshold when the DS processing determines that the data object is substantially already stored in the DSN memory. The method 1000 continues to the next step 1020 when the DS processing determines that the data object is substantially not already stored in the DSN memory.

In the next step 1020, the DS processing determines write operational parameters and saves the parameters (e.g., so that the DS processing always has a way to retrieve the data object). The determination may be based on one or more of, but not limited to an estimation of the number of common users that may store this same data object, the user ID, the store request, a vault lookup, a predetermination, a command, the data object name, the data size, the data type, the hash of the data object, the priority indicator, the security indicator, and/or the performance indicator. For example, the DS processing determines the write operational parameters to include a pillar width of n=32 and a read threshold of 24 when the estimation of the number of common users that may store this same data object is 5 million. Note that there are over 10 million ways to choose 24 read pillars from the 32 pillars. The DS processing saves the write operational parameters, hash of the data object, and data object name in a vault, the list of hash values of previously stored data objects, and/or in the DSN memory for reference when subsequently determining if the data object is already stored in the DSN memory.

The DS processing creates EC data slices of the data object in step 1022 in accordance with the write operational parameters and sends the slices to the DSN memory with a store command.

The DS processing determines and saves read operational parameters in the user vault (e.g., assigned to the user ID) in step 1024, and/or the DSN memory where the read operational parameters includes one or more unique read pillar combinations (e.g., a specific subset of the DS unit pillars of the write operational parameters). The determination may be based on one or more of, but not limited to the write operational parameters for this storage set, the number of available combinations for this storage set, an estimation of the number of common users that may store this same data object for this storage set, the actual number of common users storing this same data object for this storage set, a subscription level indicator (e.g., pay for more combinations), the user ID, the store request, a vault lookup, a predetermination, a command, the data object name, the data size, the data type, the hash of the data object, the priority indicator, the security indicator, and/or the performance indicator. For example, the DS processing may assign the user ID ten unique read pillar combinations for this storage set where each combination comprises at least a read threshold of pillar numbers when the actual number of common users storing this same data object for this storage set is much less than the estimation of the number of common users that may store this same data object for this storage set and when the number of available combinations for this storage set is above a threshold.

The DS processing sends the read operational parameters to the user device in step 1026 such that the DS processing of user device may retrieve slices from the DSN memory to recreate the data object.

The DS processing determines if the number of number of assigned pillar combinations for the present storage set compares favorably to a threshold when the DS processing determines that the data object is substantially already stored in the DSN memory.

The DS processing determines and saves read operational parameters in the user vault (e.g., assigned to the user ID) in step 1034, and/or the DSN memory where the read operational parameters includes one or more unique read pillar combinations (e.g., a specific subset of the DS unit pillars of the write operational parameters). The determination may be based on one or more of, but not limited to the write operational parameters for this storage set, the number of available combinations for this storage set, an estimation of the number of common users that may store this same data object for this storage set, the actual number of common users storing this same data object for this storage set, a subscription level indicator (e.g., pay for more combinations), the user ID, the store request, a vault lookup, a predetermination, a command, the data object name, the data size, the data type, the hash of the data object, the priority indicator, the security indicator, and/or the performance indicator. For example, the DS processing may assign the user ID ten unique read pillar combinations for this storage set where each combination comprises at least a read threshold of pillar numbers when the actual number of common users storing this same data object for this storage set is much less than the estimation of the number of common users that may store this same data object for this storage set and when the number of available combinations for this storage set is above a threshold. The DS processing sends the read operational parameters to the user device in step 1036 such that the DS processing of user device may retrieve slices from the DSN memory to recreate the data object.

The DS processing determines that the number of assigned pillar combinations for the present storage set compares favorably to a threshold when the retrieved actual number of assigned read pillar combinations for this same data object for the present storage set is less than the threshold. For example, the DS processing determines that the number of number of assigned pillar combinations for the present storage set compares favorably to a threshold when the retrieved actual number of assigned read pillar combinations for this same data object for the present storage set is 1,000 and the threshold is 10,000 combinations.

The method 1000 branches forward to the step 1040 where the DS processing determines write operational parameters and saves the write operational parameters when the DS processing determines that the number of assigned pillar combinations for the present storage set does not compare favorably to the threshold. In that scenario, the DS processing stores an additional copy of the data object in the DSN memory in step 1042 (e.g., creating slices (e.g., EDSs) and store command to DSN memory.

The method 1000 continues to the next step 1040 when the DS processing determines that the number of assigned pillar combinations for the present storage set does compare favorably to the threshold.

In the next step 1034, the DS processing determines and saves read operational parameters. Note that in this scenario, the DS processing need not store the data object again in the DSN memory. The DS processing will assign more unique combinations of read pillars to the user ID. The DS processing determines and saves read operational parameters in the user vault (e.g., assigned to the user ID), and/or the DSN memory where the read operational parameters includes one or more unique read pillar combinations (e.g., a specific subset of the DS unit pillars of the write operational parameters). The determination may be based on one or more of, but not limited to the write operational parameters for this storage set, the number of available combinations for this storage set, an estimation of the number of common users that may store this same data object for this storage set, the actual number of common users storing this same data object for this storage set, a subscription level indicator (e.g., pay for more combinations), the user ID, the store request, a vault lookup, a predetermination, a command, the data object name, the data size, the data type, the hash of the data object, the priority indicator, the security indicator, and/or the performance indicator. For example, the DS processing may assign the user ID 1,000 unique read pillar combinations where each combination comprises at least a read threshold of pillar 30 numbers when the actual number of common users storing this same data object for this storage set is much less than the estimation of the number of common users that may store this same data object in this storage set, the number of available combinations for this storage set is above a threshold, and subscription level indicator is above a threshold for 1,000 combinations for this storage set.

The DS processing sends the read operational parameters to the user device such that the DS processing of user device may retrieve slices from the DSN memory to recreate the data object in step 1036.

Then, in step 1040, the DS processing determines write operational parameters and saves the parameters (e.g., so that the DS processing always has a way to retrieve the data object) when the DS processing determines that the number of assigned pillar combinations for the present storage set does not compare favorably to the threshold. The determination may be based on one or more of, but not limited to the previous write operational parameters (e.g., such that different parameters may be determined), an estimation of the number of common users that may store this same data object, the actual number of common users that have stored this same data object the user ID, the store request, a vault lookup, a predetermination, a command, the data object name, the data size, the data type, the hash of the data object, the priority indicator, the security indicator, and/or the performance indicator. For example, the DS processing determines the write operational parameters to include a pillar width of n=32 and a read threshold of 24 when the estimation of the number of common users that may store this same data object is 5 million. Note that there are over 10 million ways to choose 24 read pillars from the 32 pillars. Note that the DS processing may determine a DS unit storage set that is the same as a previous storage set for the same data object but with different slice names. The DS 25 processing saves the write operational parameters, hash of the data object, and data object name in a vault, the list of hash values of previously stored data objects, and/or in the DSN memory for reference when subsequently determining if the data object is already stored in the DSN memory.

The DS processing creates EC data slices of the data object in accordance with the write operational parameters and sends the slices to the DSN memory with a store command in step 1042.

Then in step 1044, the DS processing determines and saves read operational parameters in the user vault (e.g., assigned to the user ID), and/or the DSN memory where the read operational parameters includes one or more unique read pillar combinations (e.g., a specific subset of the DS unit pillars of the write operational parameters). The determination may be based on one or more of, but not limited to the currently active storage set, the write operational parameters for this storage set, the number of available combinations for this storage set, an estimation of the number of common users that may store this same data object in this storage set, the actual number of common users storing this same data object in this storage set, a subscription level indicator (e.g., pay for more combinations), the user ID, the store request, a vault lookup, a predetermination, a command, the data object name, the data size, the data type, the hash of the data object, the priority indicator, the security indicator, and/or the performance indicator. For example, the DS processing may assign the user ID ten unique read pillar combinations for this storage set where each combination comprises at least a read threshold of pillar numbers when the actual number of common users storing this same data object is much less than the estimation of the number of common users that may store this same data object in this storage set and when the number of available combinations for this storage set is above a threshold.

The DS processing sends the read operational parameters to the user device such that the DS processing of user device may retrieve slices from the DSN memory to recreate the data object in step 1046.

FIG. 11A is a schematic block diagram of another example 1101 of an error encoding function in accordance with the present invention. This diagram may be understood with reference to FIG. 4. The number of rows of the encoding matrix (EM) may be scaled (e.g., increased or decreased) to generate a scaled number of rows (e.g., increased or decreased) of the coded matrix (CM). For example, if the number of rows of the EM is increased by N (a positive integer), then the number of rows of the CM is also increased by N. Similarly, if the number of rows of the EM is decreased by N (a positive integer), then the number of rows of the CM is also decreased by N. Modification of the number of rows of the CM can be used to scale (e.g., increase or decrease) the number of rows of EM and scale (e.g., increase or decrease) the number of EDSs generated based on data segments of a data object.

FIG. 11B is a schematic block diagram of another example 1102 of an error encoding function in accordance with the present invention. This diagram may be understood with reference to FIG. 5. For example, as the number of rows of the encoding matrix (EM) is increased (e.g., to include one or more rows as shown by a last row that includes elements p, n, and o), then the number of rows of the coded matrix (CM) is similarly increased (e.g., to include one or more rows as shown by a last row that includes elements XZ1 through XZ4 that corresponds to one or more additional EDSs shown by EDS Z_1). Increasing of the number of rows of the CM can be used to increase the number of rows of EM and increase the number of EDSs generated based on data segments of a data object.

Figure 12:
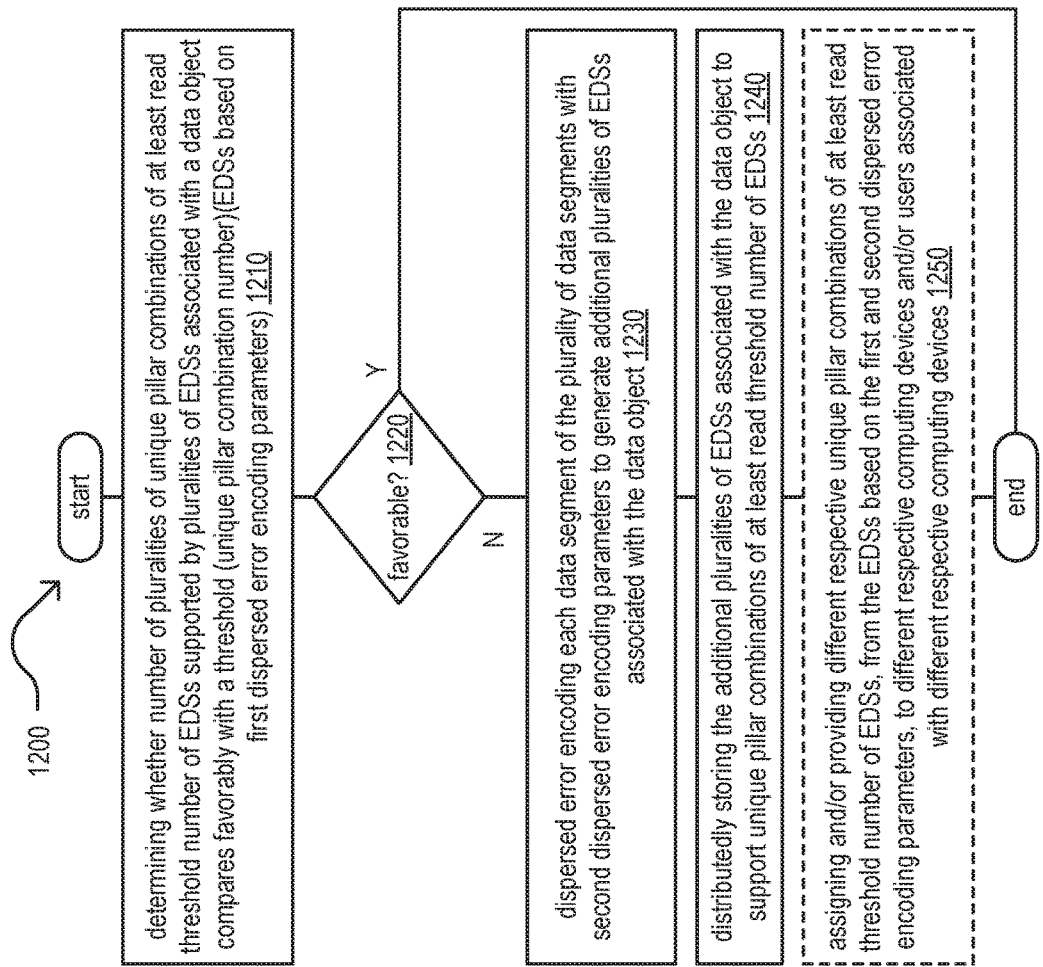
FIG. 12 is a diagram illustrating an embodiment of another method for execution by one or more or more computing devices in accordance with the present invention.

FIG. 12 is a diagram illustrating an embodiment of another method 1200 for execution by one or more or more computing devices in accordance with the present invention. The method 1200 operates by determining whether a number of pluralities of unique pillar combinations of at least read threshold number of encoded data slices (EDSs) supported by pluralities of EDSs associated respectively with a data object compares favorably with a threshold number in step 1210. Note that the pluralities of EDSs are distributedly stored across a plurality of storage units (SUs) within a dispersed storage network (DSN). The data object is segmented into a plurality of data segments, and a data segment of the plurality of data segments is dispersed error encoded in accordance with first dispersed error encoding parameters to produce a set of EDSs. Note also that the read threshold number of EDSs provides for reconstruction of the data segment, and a write threshold number of EDSs provides for a successful transfer of the set of EDSs from a first at least one storage location in the DSN to a second at least one storage location in the DSN.

Then, when the number of pluralities of unique pillar combinations of the at least read threshold number of EDSs supported by the pluralities of EDSs associated respectively with the data object compares unfavorably with a unique pillar combination number as shown in step 1220, the method 1200 operates by ending. Alternatively, when the number of pluralities of unique pillar combinations of the at least read threshold number of EDSs supported by the pluralities of EDSs associated respectively with the data object compares favorably with a unique pillar combination number as shown in step 1220, the method 1200 continues by dispersed error encoding each data segment of the plurality of data segments in accordance with second dispersed error encoding parameters to generate additional pluralities of EDSs associated respectively with the data object in step 1230. Note that the additional pluralities of EDSs support additional unique pillar combinations of the at least read threshold number of EDSs. The method 1200 then operates by distributedly storing the additional pluralities of EDSs associated respectively with the data object across the plurality of SUs within the DSN to support the additional unique pillar combinations of the at least read threshold number of EDSs in step 1240.

In some examples, the method 1200 operates by assigning and/or providing different respective unique pillar combinations of at least read threshold number of EDSs, from the EDSs based on the first and second dispersed error encoding parameters, to different respective computing devices and/or users associated with different respective computing devices in optional step 1250.

In some examples, the data segment of the plurality of data segments is dispersed error encoded in accordance with the first dispersed error encoding parameters to produce the set of EDSs that is of a first pillar width, and the data segment of the plurality of data segments is dispersed error encoded in accordance with the second dispersed error encoding parameters to produce another set of EDSs that is of a second pillar width that is greater than the first pillar width.

In even other examples, the data segment of the plurality of data segments is dispersed error encoded in accordance with the first dispersed error encoding parameters to produce the set of EDSs that is of a first pillar width, and the read threshold number of EDSs provides for reconstruction of the data segment in accordance with the first dispersed error encoding parameters, and the data segment of the plurality of data segments is dispersed error encoded in accordance with the second dispersed error encoding parameters to produce another set of EDSs that is of a second pillar width that is greater than the first pillar width, and the read threshold number of EDSs also provides for reconstruction of the data segment in accordance with the second dispersed error encoding parameters.

In even other examples, the data segment of the plurality of data segments is dispersed error encoded in accordance with the first dispersed error encoding parameters to produce the set of EDSs that is of a first pillar width, and the read threshold number of EDSs provides for reconstruction of the data segment in accordance with the first dispersed error encoding parameters, and the data segment of the plurality of data segments is dispersed error encoded in accordance with the second dispersed error encoding parameters to produce another set of EDSs that is of a second pillar width that is greater than the first pillar width, and another read threshold number of EDSs provides for reconstruction of the data segment in accordance with the second dispersed error encoding parameters.

In certain embodiments, the method 1200 also operates by assigning a first unique pillar combination of the pluralities of unique pillar combinations of the at least read threshold number of EDSs supported by the pluralities of EDSs to a first other computing device or a first user associated with the first other computing device, assigning a second unique pillar combination of the pluralities of unique pillar combinations of the at least read threshold number of EDSs supported by the pluralities of EDSs to a second other computing device or a second user associated with the first other computing device, assigning a first unique pillar combination of the additional unique pillar combinations of the at least read threshold number of EDSs to a third other computing device or a third user associated with the third other computing device, and assigning a second unique pillar combination of the additional unique pillar combinations of the at least read threshold number of EDSs to a fourth other computing device or a third user associated with the fourth other computing device.

In certain other embodiments, the method 1200 also operates by providing (e.g., via the DSN) a first unique pillar combination of the pluralities of unique pillar combinations of the at least read threshold number of EDSs supported by the pluralities of EDSs to a first other computing device or a first user associated with the first other computing device, providing (e.g., via the DSN) a second unique pillar combination of the pluralities of unique pillar combinations of the at least read threshold number of EDSs supported by the pluralities of EDSs to a second other computing device or a second user associated with the first other computing device, providing (e.g., via the DSN) a first unique pillar combination of the additional unique pillar combinations of at least read threshold number of EDSs to a third other computing device or a third user associated with the third other computing device, and providing (e.g., via the DSN) a second unique pillar combination of the additional unique pillar combinations of at least read threshold number of EDSs to a fourth other computing device or a third user associated with the fourth other computing device.

Note that a computing device that performs such operations, functions, etc. may be located at a first premises that is remotely located from at least one SU of the plurality of SUs within the DSN. Note also that the computing device may include a SU of the plurality of SUs within the DSN. In addition, the computing device may include a wireless smart phone, a laptop, a tablet, a personal computers (PC), a work station, and/or a video game device.

In some examples, various computing devices and/or methods described herein operate based on a system where large numbers of other devices (e.g., such as associated with users) may desire to store the same data object. The system starts the storage process by creating and storing slices (e.g., EDSs such as by modifying the EM as described herein or by performing additional dispersed error encoding processes, operations, etc.) for the first record operation. Multiple users may then be given one or more combinations of read pillars to access the content. Additional one or more copies of the content may be added when the system runs out of unique read pillar combinations as more users use, record, consume, request, etc. the same content. Then, these additional unique read pillar combinations may be doles out for a second store, and the system can use different storage set and information dispersal algorithm (IDA) scheme based on rate of assignment of pillar combinations.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
an interface configured to interface and communicate with a dispersed or distributed storage network (DSN);
memory that stores operational instructions; and
a processing module operably coupled to the interface and to the memory, wherein the processing module, when operable within the computing device based on the operational instructions, is configured to:
receive a read request for a data object from another computing device and via the DSN, wherein the data object is segmented into a plurality of data segments, wherein a data segment of the plurality of data segments is dispersed error encoded in accordance with dispersed error encoding parameters to produce a set of encoded data slices (EDSs), wherein unique pillar combinations of at least a decode threshold number of EDSs of the set of EDSs provide for unique recovery of the data segment;
determine, for the data segment and based on the read request for the data object, whether a unique pillar combination of the at least the decode threshold number of EDSs is available to be assigned to the another computing device;
when the unique pillar combination of the at least the decode threshold number of EDSs is determined to be available, assign the unique pillar combination of the at least the decode threshold number of EDSs of the set of EDSs to the another computing device; and
when no unique pillar combination of the at least the decode threshold number of EDSs is determined to available: and
dispersed error encode the data segment in accordance with other dispersed error encoding parameters to generate another set of EDSs, wherein other unique pillar combinations of at least the decode threshold number of EDSs of the another set of EDSs provide for recovery of the data segment; and
assign one of the other unique pillar combinations of the at least the decode threshold number of EDSs of the another set of EDSs to the another computing device.

2. The computing device of claim 1, wherein:
the data segment of the plurality of data segments is dispersed error encoded in accordance with the dispersed error encoding parameters to produce the set of EDSs that is of a first pillar width; and
the data segment of the plurality of data segments is dispersed error encoded in accordance with the other dispersed error encoding parameters to produce the another set of EDSs that is of a second pillar width that is greater than the first pillar width.

3. The computing device of claim 1, wherein the processing module, when operable within the computing device based on the operational instructions for the data segment and based on the read request for the data object, is further configured to:
retrieve the unique pillar combination of the at least the decode threshold number of EDSs of the set of EDSs from a plurality of storage units (SUs) within the DSN that distributedly store the set of EDSs; and
provide the unique pillar combination of the at least the decode threshold number of EDSs to the another computing device via the DSN.

4. The computing device of claim 1, wherein the processing module, when operable within the computing device based on the operational instructions for the data segment and based on the read request for the data object, is further configured to:

distributedly store the another set of EDSs within a plurality of storage units (SUs) within the DSN;

retrieve the one of the unique pillar combinations of the at least the decode threshold number of EDSs of the another set of EDSs from the plurality of SUs; and provide the one of the unique pillar combinations of the at least the decode threshold number of EDSs of the another set of EDSs to the another computing device via the DSN.

5. The computing device of claim 1, wherein:

at least one of the set of EDSs or the another set of EDSs is distributedly stored among a plurality of storage units (SUs) within the DSN;

a read threshold number of EDSs of the at least one of the set of EDSs or the another set of EDSs provides for reconstruction of the data segment; and a write threshold number of EDSs of the at least one of the set of EDSs or the another set of EDSs provides for a successful transfer of the set of EDSs from a first at least one location in the DSN to a second at least one location in the DSN.

6. The computing device of claim 1, wherein the computing device is located at a first premises that is remotely located from at least one storage unit (SU) of a plurality of storage units (SUs) within the DSN that distributedly store at least one of the set of EDSs or the another set of EDSs.

7. The computing device of claim 1 further comprising:

a SU of a plurality of storage units (SUs) within the DSN that distributedly store at least one of the set of EDSs or the another set of EDSs, a wireless smart phone, a laptop, a tablet, a personal computers (PC), a work station, or a video game device.

8. The computing device of claim 1, wherein the DSN includes at least one of a wireless communication system, a wire lined communication systems, a non-public intranet system, a public internet system, a local area network (LAN), or a wide area network (WAN).

9. A computing device comprising:

an interface configured to interface and communicate with a dispersed or distributed storage network (DSN);

memory that stores operational instructions; and a processing module operably coupled to the interface and to the memory, wherein the processing module, when operable within the computing device based on the operational instructions, is configured to:

receive a read request for a data object from another computing device and via the DSN, wherein the data object is segmented into a plurality of data segments, wherein a data segment of the plurality of data segments is dispersed error encoded in accordance with dispersed error encoding parameters to produce a set of encoded data slices (EDSs) that is of a first pillar width, wherein unique pillar combinations of at least a decode threshold number of EDSs of the set of EDSs provide for unique recovery of the data segment, wherein the set of EDSs is distributedly stored among a plurality of storage units (SUs) within the DSN, wherein a read threshold number of EDSs of the set of EDSs provides for reconstruction of the data segment, and wherein a write threshold number of EDSs of the set of EDSs provides for a successful transfer of the set of EDSs from a first at least one location in the DSN to a second at least one location in the DSN;

determine, for the data segment and based on the read request for the data object, whether a unique pillar combination of the at least the decode threshold number of EDSs is available to be assigned to the another computing device;

when the unique pillar combination of the at least the decode threshold number of EDSs is determined to be available, assign the unique pillar combination of the at least the decode threshold number of EDSs of the set of EDSs to the another computing device; and when no unique pillar combination of the at least the decode threshold number of EDSs is determined to available: and dispersed error encode the data segment in accordance with other dispersed error encoding parameters to generate another set of EDSs that is of a second pillar width that is greater than the first pillar width, wherein other unique pillar combinations of at least the decode threshold number of EDSs of the another set of EDSs provide for recovery of the data segment; and assign one of the other unique pillar combinations of the at least the decode threshold number of EDSs of the another set of EDSs to the another computing device.

10. The computing device of claim 9, wherein the processing module, when operable within the computing device based on the operational instructions for the data segment and based on the read request for the data object, is further configured to:

retrieve the unique pillar combination of the at least the decode threshold number of EDSs of the set of EDSs from a plurality of storage units (SUs) within the DSN that distributedly store the set of EDSs; and provide the unique pillar combination of the at least the decode threshold number of EDSs to the another computing device via the DSN.

11. The computing device of claim 9, wherein the processing module, when operable within the computing device based on the operational instructions for the data segment and based on the read request for the data object, is further configured to:

distributedly store the another set of EDSs within a plurality of storage units (SUs) within the DSN;

retrieve the one of the unique pillar combinations of the at least the decode threshold number of EDSs of the another set of EDSs from the plurality of SUs; and provide the one of the unique pillar combinations of the at least the decode threshold number of EDSs of the another set of EDSs to the another computing device via the DSN.

12. The computing device of claim 9 further comprising:

a SU of the plurality of SUs within the DSN, a wireless smart phone, a laptop, a tablet, a personal computers (PC), a work station, or a video game device.

13. The computing device of claim 9, wherein the DSN includes at least one of a wireless communication system, a wire lined communication systems, a non-public intranet system, a public internet system, a local area network (LAN), or a wide area network (WAN).

14. A method for execution by a computing device, the method comprising:

receiving, via an interface of the computing device that is configured to interface and communicate with a dispersed or distributed storage network (DSN), a read request for a data object from another computing device and via the DSN, wherein the data object is segmented into a plurality of data segments, wherein a data segment of the plurality of data segments is dispersed error encoded in accordance with dispersed error encoding parameters to produce a set of encoded data slices (EDSs), wherein unique pillar combinations of at least a decode threshold number of EDSs of the set of EDSs provide for unique recovery of the data segment;

determining, for the data segment and based on the read request for the data object, whether a unique pillar combination of the at least the decode threshold number of EDSs is available to be assigned to the another computing device;

when the unique pillar combination of the at least the decode threshold number of EDSs is determined to be available, assigning the unique pillar combination of the at least the decode threshold number of EDSs of the set of EDSs to the another computing device; and when no unique pillar combination of the at least the decode threshold number of EDSs is determined to available: and dispersed error encoding the data segment in accordance with other dispersed error encoding parameters to generate another set of EDSs, wherein other unique pillar combinations of at least the decode threshold number of EDSs of the another set of EDSs provide for recovery of the data segment; and assigning one of the other unique pillar combinations of the at least the decode threshold number of EDSs of the another set of EDSs to the another computing device.

15. The method of claim 14, wherein:

the data segment of the plurality of data segments is dispersed error encoded in accordance with the dispersed error encoding parameters to produce the set of EDSs that is of a first pillar width; and the data segment of the plurality of data segments is dispersed error encoded in accordance with the other dispersed error encoding parameters to produce the another set of EDSs that is of a second pillar width that is greater than the first pillar width.

16. The method of claim 14 further comprising:

retrieving the unique pillar combination of the at least the decode threshold number of EDSs of the set of EDSs from a plurality of storage units (SUs) within the DSN that distributedly store the set of EDSs; and providing the unique pillar combination of the at least the decode threshold number of EDSs to the another computing device via the DSN.

17. The method of claim 14 further comprising:

distributedly storing the another set of EDSs within a plurality of storage units (SUs) within the DSN;

retrieving the one of the unique pillar combinations of the at least the decode threshold number of EDSs of the another set of EDSs from the plurality of SUs; and providing the one of the unique pillar combinations of the at least the decode threshold number of EDSs of the another set of EDSs to the another computing device via the DSN.

18. The method of claim 14, wherein:

at least one of the set of EDSs or the another set of EDSs is distributedly stored among a plurality of storage units (SUs) within the DSN;

a read threshold number of EDSs of the at least one of the set of EDSs or the another set of EDSs provides for reconstruction of the data segment; and a write threshold number of EDSs of the at least one of the set of EDSs or the another set of EDSs provides for a successful transfer of the set of EDSs from a first at least one location in the DSN to a second at least one location in the DSN.

19. The method of claim 14, wherein the computing device includes a SU of a plurality of storage units (SUs) within the DSN that distributedly store at least one of the set of EDSs or the another set of EDSs, a wireless smart phone, a laptop, a tablet, a personal computers (PC), a work station, or a video game device.

20. The method of claim 14, wherein the DSN includes at least one of a wireless communication system, a wire lined communication systems, a non-public intranet system, a public internet system, a local area network (LAN), or a wide area network (WAN).

* * * * *